(12) United States Patent
Hubbard et al.

(10) Patent No.: US 9,378,282 B2
(45) Date of Patent: Jun. 28, 2016

(54) SYSTEM AND METHOD FOR DYNAMIC AND REAL-TIME CATEGORIZATION OF WEBPAGES

(75) Inventors: Daniel Lyle Hubbard, Carlsbad, CA (US); Dan Ruskin, Poway, CA (US)

(73) Assignee: Raytheon Company, Waltham, MA (US)

( * ) Notice: Subject to any disclaimer, the term of this patent is extended or adjusted under 35 U.S.C. 154(b) by 386 days.

(21) Appl. No.: 12/494,052

(22) Filed: Jun. 29, 2009

(65) Prior Publication Data

US 2010/0115615 A1 May 6, 2010

Related U.S. Application Data (60) Provisional application No. 61/077,069, filed on Jun. 30, 2008.

(51) Int. Cl.
G06F 11/00 (2006.01)
G06F 17/30 (2006.01)

(52) U.S. Cl.
CPC .............................. *G06F 17/30864* (2013.01)

(58) Field of Classification Search
CPC .......... G06Q 10/0635; G06Q 30/0241; G06Q 30/0263; G06Q 30/0278; H04L 63/1408; H04L 63/1433; H04L 63/1416; H04L 63/145; G06F 2221/2119; G06F 17/3053; G06F 17/30775; G05B 2219/24159
USPC ....................................... 726/2, 22; 709/223
See application file for complete search history.

(56) References Cited

U.S. PATENT DOCUMENTS

| | | | |
|---|---|---|---|
| 4,423,414 A | 12/1983 | Bryant et al. | |
| 4,734,036 A | 3/1988 | Kasha | |
| 4,941,084 A | 7/1990 | Terada et al. | |
| 5,408,642 A | 4/1995 | Mann | |
| 5,493,692 A | 2/1996 | Theimer et al. | |
| 5,541,911 A | 7/1996 | Nilakantan et al. | |
| 5,548,729 A | 8/1996 | Akiyoshi et al. | |

(Continued)

FOREIGN PATENT DOCUMENTS

| EP | 0 658 837 A2 | 12/1994 |
|---|---|---|
| EP | 0 748 095 | 12/1996 |

(Continued)

OTHER PUBLICATIONS

IronPort Web Reputation White Paper, A Comprehensive, Proactive Approach to Web-Based Threats, Ironport Systems 2009, pp. 10.

(Continued)

*Primary Examiner* — Ali Abyaneh
(74) *Attorney, Agent, or Firm* — Knobbe, Martens, Olson & Bear LLP (57) ABSTRACT

A system and method for categorizing content on a webpage is disclosed. The method comprises receiving a request for a webpage from a user's computer. Next, the system determines whether there is dynamic content on the webpage by analyzing the address, links, reputation, type, style and other indicators of being able to easily change the webpage. If the webpage contains content that can be changed, then the webpage is analyzed to determine a current categorization thereof. If the webpage does not have dynamic content then the categorization of the webpage will remain the same thereby freeing system resources by only analyzing dynamic webpages.

14 Claims, 10 Drawing Sheets

(56) References Cited

U.S. PATENT DOCUMENTS

| | | |
|---|---|---|
| 5,555,376 A | 9/1996 | Theimer et al. |
| 5,581,703 A | 12/1996 | Baugher et al. |
| 5,586,121 A | 12/1996 | Moura et al. |
| 5,606,668 A | 2/1997 | Shwed |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,712,979 A | 1/1998 | Graber et al. |
| 5,724,576 A | 3/1998 | Letourneau |
| 5,758,257 A | 5/1998 | Herz et al. |
| 5,768,519 A | 6/1998 | Swift et al. |
| 5,774,668 A | 6/1998 | Choquier et al. |
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,833 A | 10/1998 | Belville et al. |
| 5,828,835 A | 10/1998 | Isfeld et al. |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,893,086 A | 4/1999 | Schmuck et al. |
| 5,896,502 A | 4/1999 | Shieh et al. |
| 5,899,991 A | 5/1999 | Karch |
| 5,899,995 A | 5/1999 | Millier et al. |
| 5,911,043 A | 6/1999 | Duffy et al. |
| 5,919,257 A | 7/1999 | Trostle |
| 5,920,859 A | 7/1999 | Li |
| 5,933,827 A | 8/1999 | Cole et al. |
| 5,937,404 A | 8/1999 | Csaszar et al. |
| 5,941,947 A | 8/1999 | Brown et al. |
| 5,944,794 A | 8/1999 | Okamoto et al. |
| 5,950,195 A | 9/1999 | Stockwell et al. |
| 5,956,734 A | 9/1999 | Schmuck et al. |
| 5,958,015 A | 9/1999 | Dascalu |
| 5,961,591 A | 10/1999 | Jones et al. |
| 5,963,941 A | 10/1999 | Hirakawa |
| 5,968,176 A | 10/1999 | Nessett et al. |
| 5,974,549 A | 10/1999 | Golan |
| 5,978,807 A | 11/1999 | Mano et al. |
| 5,983,270 A | 11/1999 | Abraham et al. |
| 5,987,457 A | 11/1999 | Ballard |
| 5,987,606 A | 11/1999 | Cirasole et al. |
| 5,987,611 A * | 11/1999 | Freund ........................... 726/4 |
| 5,991,807 A | 11/1999 | Schmidt et al. |
| 5,996,011 A | 11/1999 | Humes |
| 5,999,929 A | 12/1999 | Goodman |
| 6,052,723 A | 4/2000 | Ginn |
| 6,052,730 A | 4/2000 | Felciano et al. |
| 6,055,564 A | 4/2000 | Phaal |
| 6,058,389 A | 5/2000 | Chandra et al. |
| 6,065,056 A | 5/2000 | Bradshaw et al. |
| 6,065,059 A | 5/2000 | Shieh et al. |
| 6,070,242 A | 5/2000 | Wong et al. |
| 6,073,135 A | 6/2000 | Broder et al. |
| 6,073,239 A | 6/2000 | Dotan |
| 6,078,913 A | 6/2000 | Aoki et al. |
| 6,078,914 A | 6/2000 | Redfern |
| 6,085,241 A | 7/2000 | Otis |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,175,830 B1 | 1/2001 | Maynard |
| 6,178,419 B1 | 1/2001 | Legh-Smith et al. |
| 6,178,505 B1 | 1/2001 | Schneider et al. |
| 6,182,118 B1 | 1/2001 | Finney et al. |
| 6,219,667 B1 | 4/2001 | Lu et al. |
| 6,233,618 B1 | 5/2001 | Shannon |
| 6,233,686 B1 | 5/2001 | Zenchelsky et al. |
| 6,246,977 B1 | 6/2001 | Messerly et al. |
| 6,253,188 B1 | 6/2001 | Witek et al. |
| 6,266,664 B1 | 7/2001 | Russell-Falla et al. |
| 6,266,668 B1 | 7/2001 | Vanderveldt et al. |
| 6,286,001 B1 | 9/2001 | Walker et al. |
| 6,295,529 B1 | 9/2001 | Corston-Oliver et al. |
| 6,295,559 B1 | 9/2001 | Emens et al. |
| 6,338,088 B1 | 1/2002 | Waters et al. |
| 6,356,864 B1 | 3/2002 | Foltz et al. |
| 6,357,010 B1 | 3/2002 | Viets et al. |
| 6,377,577 B1 | 4/2002 | Bechtolsheim et al. |
| 6,389,472 B1 | 5/2002 | Hughes et al. |
| 6,418,433 B1 | 7/2002 | Chakrabarti et al. |
| 6,434,662 B1 | 8/2002 | Greene et al. |
| 6,446,061 B1 | 9/2002 | Doerre et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,493,744 B1 | 12/2002 | Emens et al. |
| 6,505,201 B1 | 1/2003 | Haitsuka et al. |
| 6,516,337 B1 | 2/2003 | Tripp et al. |
| 6,519,571 B1 | 2/2003 | Guheen et al. |
| 6,539,430 B1 | 3/2003 | Humes |
| 6,564,327 B1 | 5/2003 | Klensin et al. |
| 6,567,800 B1 | 5/2003 | Barrera et al. |
| 6,571,249 B1 | 5/2003 | Garrecht et al. |
| 6,574,660 B1 | 6/2003 | Pashupathy et al. |
| 6,606,659 B1 | 8/2003 | Hegli et al. |
| 6,654,735 B1 | 11/2003 | Eichstaedt et al. |
| 6,654,787 B1 | 11/2003 | Aronson et al. |
| 6,675,169 B1 | 1/2004 | Bennett et al. |
| 6,741,997 B1 | 5/2004 | Liu et al. |
| 6,742,003 B2 | 5/2004 | Heckerman et al. |
| 6,745,367 B1 | 6/2004 | Bates et al. |
| 6,769,009 B1 | 7/2004 | Reisman |
| 6,772,214 B1 | 8/2004 | McClain et al. |
| 6,785,732 B1 | 8/2004 | Bates et al. |
| 6,804,780 B1 | 10/2004 | Touboul |
| 6,807,558 B1 | 10/2004 | Hassett et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,862,713 B1 | 3/2005 | Kraft et al. |
| 6,894,991 B2 | 5/2005 | Ayyagari et al. |
| 6,907,425 B1 | 6/2005 | Barrera et al. |
| 6,947,985 B2 | 9/2005 | Hegli et al. |
| 6,978,292 B1 | 12/2005 | Murakami et al. |
| 6,981,281 B1 | 12/2005 | LaMacchia et al. |
| 6,988,209 B1 | 1/2006 | Balasubramaniam et al. |
| 7,003,442 B1 | 2/2006 | Tsuda |
| 7,058,822 B2 | 6/2006 | Edery et al. |
| 7,065,483 B2 | 6/2006 | Decary et al. |
| 7,089,246 B1 * | 8/2006 | O'Laughlen ...................... 726/4 |
| 7,093,293 B1 | 8/2006 | Smithson et al. |
| 7,096,493 B1 | 8/2006 | Liu |
| 7,136,867 B1 | 11/2006 | Chatterjee et al. |
| 7,185,015 B2 | 2/2007 | Kester et al. |
| 7,185,361 B1 | 2/2007 | Ashoff et al. |
| 7,194,554 B1 | 3/2007 | Short et al. |
| 7,197,713 B2 | 3/2007 | Stern |
| 7,203,706 B2 | 4/2007 | Jain et al. |
| 7,209,893 B2 | 4/2007 | Nii |
| 7,213,069 B2 | 5/2007 | Anderson |

(56) References Cited

U.S. PATENT DOCUMENTS

| | | |
|---|---|---|
| 7,219,299 B2 | 5/2007 | Fields et al. |
| 7,260,583 B2 | 8/2007 | Wiener et al. |
| 7,313,823 B2 | 12/2007 | Gao |
| 7,359,372 B2 | 4/2008 | Pelletier et al. |
| 7,373,385 B2 | 5/2008 | Prakash |
| 7,376,154 B2 | 5/2008 | Ilnicki et al. |
| 7,487,217 B2 | 2/2009 | Buckingham et al. |
| 7,533,148 B2 | 5/2009 | McMillan et al. |
| 7,548,922 B2 | 6/2009 | Altaf et al. |
| 7,562,304 B2* | 7/2009 | Dixon et al. ............. 715/738 |
| 7,568,002 B1 | 7/2009 | Vacanti et al. |
| 7,587,488 B2* | 9/2009 | Ahlander et al. ............ 709/224 |
| 7,603,685 B2 | 10/2009 | Knudson et al. |
| 7,603,687 B2 | 10/2009 | Pietraszak et al. |
| 7,610,342 B1 | 10/2009 | Pettigrew et al. |
| 7,627,670 B2 | 12/2009 | Haverkos |
| 7,647,383 B1 | 1/2010 | Boswell et al. |
| 7,660,861 B2 | 2/2010 | Taylor |
| 7,664,819 B2 | 2/2010 | Murphy et al. |
| RE41,168 E | 3/2010 | Shannon |
| 7,689,716 B2 | 3/2010 | Short et al. |
| 7,690,013 B1 | 3/2010 | Eldering et al. |
| 7,693,945 B1 | 4/2010 | Dulitz et al. |
| 7,739,338 B2 | 6/2010 | Taylor |
| 7,739,494 B1 | 6/2010 | McCorkendale et al. |
| 7,783,597 B2 | 8/2010 | Kirsch |
| 7,797,443 B1 | 9/2010 | Pettigrew et al. |
| 7,870,203 B2 | 1/2011 | Judge et al. |
| 7,895,445 B1 | 2/2011 | Albanese et al. |
| 7,899,866 B1 | 3/2011 | Buckingham et al. |
| 7,904,958 B2 | 3/2011 | Lee |
| 7,941,490 B1 | 5/2011 | Cowings |
| 7,966,658 B2 | 6/2011 | Singh et al. |
| 7,979,895 B2 | 7/2011 | Farrell et al. |
| 2001/0032205 A1 | 10/2001 | Kubaitis |
| 2001/0032258 A1 | 10/2001 | Ishida et al. |
| 2001/0039582 A1 | 11/2001 | McKinnon et al. |
| 2001/0047343 A1 | 11/2001 | Dahan et al. |
| 2002/0042821 A1 | 4/2002 | Muret et al. |
| 2002/0049883 A1 | 4/2002 | Schneider et al. |
| 2002/0059221 A1 | 5/2002 | Whitehead et al. |
| 2002/0062359 A1 | 5/2002 | Klopp et al. |
| 2002/0069368 A1 | 6/2002 | Hines |
| 2002/0073068 A1 | 6/2002 | Guha |
| 2002/0073089 A1 | 6/2002 | Schwartz et al. |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095415 A1 | 7/2002 | Walker et al. |
| 2002/0099952 A1 | 7/2002 | Lambert et al. |
| 2002/0110084 A1 | 8/2002 | Butt et al. |
| 2002/0129039 A1 | 9/2002 | Majewski et al. |
| 2002/0129140 A1 | 9/2002 | Peled et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0152284 A1 | 10/2002 | Cambray et al. |
| 2002/0174358 A1 | 11/2002 | Wolff et al. |
| 2002/0178374 A1 | 11/2002 | Swimmer et al. |
| 2002/0188671 A1* | 12/2002 | Kogut-O'Connell G06F 17/3089 709/203 |
| 2002/0194194 A1 | 12/2002 | Fenton et al. |
| 2002/0199095 A1 | 12/2002 | Bandini et al. |
| 2003/0005112 A1 | 1/2003 | Krautkremer |
| 2003/0009495 A1 | 1/2003 | Adjaoute |
| 2003/0023860 A1 | 1/2003 | Eatough et al. |
| 2003/0028564 A1 | 2/2003 | Sanfilippo |
| 2003/0033525 A1 | 2/2003 | Rajaram |
| 2003/0051027 A1 | 3/2003 | Aupperle et al. |
| 2003/0074567 A1 | 4/2003 | Charbonneau |
| 2003/0088577 A1 | 5/2003 | Thurnhofer et al. |
| 2003/0088680 A1 | 5/2003 | Nachenberg et al. |
| 2003/0097617 A1 | 5/2003 | Goeller et al. |
| 2003/0105863 A1 | 6/2003 | Hegli et al. |
| 2003/0110168 A1 | 6/2003 | Kester et al. |
| 2003/0110272 A1* | 6/2003 | du Castel et al. ............ 709/229 |
| 2003/0126136 A1 | 7/2003 | Omoigui |
| 2003/0126139 A1 | 7/2003 | Lee et al. |
| 2003/0135611 A1 | 7/2003 | Kemp et al. |
| 2003/0149692 A1 | 8/2003 | Mitchell |
| 2003/0158923 A1 | 8/2003 | Burkhart |
| 2003/0177187 A1 | 9/2003 | Levine et al. |
| 2003/0177394 A1 | 9/2003 | Dozortsev |
| 2003/0182420 A1 | 9/2003 | Jones et al. |
| 2003/0182421 A1 | 9/2003 | Faybishenko et al. |
| 2003/0185399 A1 | 10/2003 | Ishiguro |
| 2003/0229849 A1 | 12/2003 | Wendt |
| 2004/0003139 A1 | 1/2004 | Cottrille et al. |
| 2004/0006621 A1 | 1/2004 | Bellinson et al. |
| 2004/0006706 A1 | 1/2004 | Erlingsson |
| 2004/0015566 A1 | 1/2004 | Anderson et al. |
| 2004/0015586 A1 | 1/2004 | Hegli et al. |
| 2004/0019656 A1 | 1/2004 | Smith |
| 2004/0034794 A1 | 2/2004 | Mayer et al. |
| 2004/0049514 A1 | 3/2004 | Burkov |
| 2004/0054521 A1 | 3/2004 | Liu |
| 2004/0062106 A1 | 4/2004 | Ramesh et al. |
| 2004/0068479 A1 | 4/2004 | Wolfson et al. |
| 2004/0078591 A1 | 4/2004 | Teixeira et al. |
| 2004/0088570 A1 | 5/2004 | Roberts et al. |
| 2004/0111499 A1 | 6/2004 | Dobrowski et al. |
| 2004/0117624 A1 | 6/2004 | Brandt et al. |
| 2004/0123157 A1 | 6/2004 | Alagna et al. |
| 2004/0128285 A1 | 7/2004 | Green et al. |
| 2004/0139160 A1 | 7/2004 | Wallace et al. |
| 2004/0139165 A1 | 7/2004 | McMillan et al. |
| 2004/0148524 A1 | 7/2004 | Airamo |
| 2004/0153305 A1 | 8/2004 | Enescu et al. |
| 2004/0153644 A1 | 8/2004 | McCorkendale |
| 2004/0162876 A1 | 8/2004 | Kohavi |
| 2004/0167931 A1 | 8/2004 | Han |
| 2004/0172389 A1 | 9/2004 | Galai et al. |
| 2004/0181788 A1 | 9/2004 | Kester et al. |
| 2004/0187029 A1 | 9/2004 | Ting |
| 2004/0220918 A1 | 11/2004 | Scriffignano et al. |
| 2004/0220924 A1 | 11/2004 | Wootton |
| 2005/0015626 A1 | 1/2005 | Chasin |
| 2005/0033967 A1 | 2/2005 | Morino et al. |
| 2005/0044156 A1 | 2/2005 | Kaminski et al. |
| 2005/0050222 A1 | 3/2005 | Packer |
| 2005/0060140 A1 | 3/2005 | Maddox et al. |
| 2005/0066197 A1 | 3/2005 | Hirata et al. |
| 2005/0071748 A1 | 3/2005 | Shipp |
| 2005/0080855 A1 | 4/2005 | Murray |
| 2005/0080856 A1 | 4/2005 | Kirsch |
| 2005/0091535 A1 | 4/2005 | Kavalam et al. |
| 2005/0131859 A1* | 6/2005 | Li ..................... 707/1 |
| 2005/0131868 A1 | 6/2005 | Lin et al. |
| 2005/0132042 A1 | 6/2005 | Cryer |
| 2005/0132184 A1 | 6/2005 | Palliyil et al. |
| 2005/0155012 A1 | 7/2005 | Tayama et al. |
| 2005/0188036 A1 | 8/2005 | Yasuda |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0256955 A1 | 11/2005 | Bodwell et al. |
| 2005/0257261 A1 | 11/2005 | Shraim et al. |
| 2005/0273858 A1 | 12/2005 | Zadok et al. |
| 2005/0283836 A1 | 12/2005 | Lalonde et al. |
| 2005/0283837 A1 | 12/2005 | Olivier et al. |
| 2006/0004636 A1 | 1/2006 | Kester et al. |
| 2006/0004717 A1 | 1/2006 | Ramarathnam et al. |
| 2006/0010217 A1 | 1/2006 | Sood |
| 2006/0026105 A1 | 2/2006 | Endoh |
| 2006/0031213 A1 | 2/2006 | Wilson et al. |
| 2006/0031311 A1 | 2/2006 | Whitney et al. |
| 2006/0031359 A1 | 2/2006 | Clegg et al. |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0059238 A1 | 3/2006 | Slater et al. |
| 2006/0064469 A1 | 3/2006 | Balasubrahmaniyan et al. |
| 2006/0068755 A1 | 3/2006 | Shraim et al. |

(56) References Cited

U.S. PATENT DOCUMENTS

| | | |
|---|---|---|
| 2006/0069697 A1 | 3/2006 | Shraim et al. |
| 2006/0075072 A1 | 4/2006 | Sinclair et al. |
| 2006/0075494 A1 | 4/2006 | Bertman et al. |
| 2006/0075500 A1 | 4/2006 | Bertman et al. |
| 2006/0080735 A1 | 4/2006 | Brinson et al. |
| 2006/0095404 A1 | 5/2006 | Adelman et al. |
| 2006/0095459 A1 | 5/2006 | Adelman et al. |
| 2006/0095586 A1 | 5/2006 | Adelman et al. |
| 2006/0095965 A1 | 5/2006 | Phillips et al. |
| 2006/0101514 A1 | 5/2006 | Milener et al. |
| 2006/0122957 A1 | 6/2006 | Chen |
| 2006/0129644 A1 | 6/2006 | Owen et al. |
| 2006/0161986 A1 | 7/2006 | Singh et al. |
| 2006/0168006 A1 | 7/2006 | Shannon et al. |
| 2006/0168022 A1 | 7/2006 | Levin et al. |
| 2006/0191008 A1 | 8/2006 | Fernando et al. |
| 2006/0206713 A1 | 9/2006 | Hickman et al. |
| 2006/0259948 A1 | 11/2006 | Calow et al. |
| 2006/0265750 A1 | 11/2006 | Huddleston |
| 2006/0277280 A1 | 12/2006 | Craggs |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0028302 A1 | 2/2007 | Brennan et al. |
| 2007/0078936 A1 | 4/2007 | Quinlan et al. |
| 2007/0083929 A1 | 4/2007 | Sprosts et al. |
| 2007/0124388 A1 | 5/2007 | Thomas |
| 2007/0130351 A1 | 6/2007 | Alperovitch et al. |
| 2007/0156833 A1 | 7/2007 | Nikolov et al. |
| 2007/0195779 A1 | 8/2007 | Judge et al. |
| 2007/0204223 A1 | 8/2007 | Bartels et al. |
| 2007/0260602 A1 | 11/2007 | Taylor |
| 2007/0282952 A1 | 12/2007 | Lund et al. |
| 2007/0294352 A1 | 12/2007 | Shraim et al. |
| 2007/0294762 A1 | 12/2007 | Shraim et al. |
| 2007/0299915 A1 | 12/2007 | Shraim et al. |
| 2008/0016339 A1 | 1/2008 | Shukla |
| 2008/0077517 A1 | 3/2008 | Sappington |
| 2008/0082662 A1 | 4/2008 | Dandliker et al. |
| 2008/0086372 A1* | 4/2008 | Madhavan et al. ............ 705/14 |
| 2008/0184366 A1 | 7/2008 | Alperovitch et al. |
| 2008/0208980 A1 | 8/2008 | Champan et al. |
| 2008/0209057 A1 | 8/2008 | Martini et al. |
| 2008/0222253 A1 | 9/2008 | Bond et al. |
| 2008/0250106 A1 | 10/2008 | Rugg et al. |
| 2008/0267144 A1 | 10/2008 | Jano et al. |
| 2008/0295177 A1 | 11/2008 | Dettinger et al. |
| 2009/0070872 A1 | 3/2009 | Cowings et al. |
| 2009/0126026 A1 | 5/2009 | Kim et al. |
| 2009/0138573 A1 | 5/2009 | Campbell et al. |
| 2010/0005165 A1 | 1/2010 | Sinclair et al. |
| 2010/0017487 A1 | 1/2010 | Patinkin |
| 2010/0058023 A1 | 3/2010 | Tan |
| 2010/0154063 A1 | 6/2010 | Hutton et al. |
| 2010/0205265 A1 | 8/2010 | Milliken et al. |
| 2011/0087735 A1 | 4/2011 | Anderson |
| 2011/0099620 A1 | 4/2011 | Stavrou et al. |
| 2011/0314546 A1 | 12/2011 | Aziz et al. |

FOREIGN PATENT DOCUMENTS

| | | |
|---|---|---|
| EP | 1 130 495 | 9/2001 |
| EP | 1 278 136 | 1/2003 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 484 893 | 12/2004 |
| EP | 1 494 409 | 1/2005 |
| EP | 1 510 945 | 3/2005 |
| EP | 1 638 016 | 3/2006 |
| EP | 1 643 701 | 4/2006 |
| GB | 2418330 | 3/2006 |
| GB | 2418999 | 4/2006 |
| JP | 10 243018 | 9/1998 |
| JP | 11-219363 | 8/1999 |
| WO | WO 92/19054 | 10/1992 |
| WO | WO 96/05549 A1 | 2/1996 |
| WO | WO 96/42041 | 12/1996 |
| WO | WO 98/28690 | 7/1998 |
| WO | WO 01/24012 | 4/2001 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2005/099340 | 10/2005 |
| WO | WO 2005/119488 | 12/2005 |
| WO | WO 2006/027590 | 3/2006 |
| WO | WO 2006/030227 A1 | 3/2006 |
| WO | WO 2006/062546 | 6/2006 |
| WO | WO 2006/136605 | 12/2006 |
| WO | WO 2007/059428 A | 5/2007 |
| WO | WO 2008/008339 | 1/2008 |

OTHER PUBLICATIONS

IronPort Web Reputation: Protect and Defend Against URL-Based Threats; Ironport Systems, Apr. 2006, 8 pages.

International Search Report and Written Opinion dated Oct. 1, 2009 for International Application No. PCT/US2009/049122.

"Google + StopBadward.org = Internet Gestapo?", http://misterpoll.wordpress.com/2007/01/05/google-stopbadwareorg-internet-gestapo/, Jan. 5, 2007.

"Trends in Badware 2007", StopBadware.org.

George, Erica, "Google launches new anti-badware API", http://blog.stopbadware.org//2007/06/19/google-launches-new-anti-badware-api, Jun. 19, 2007.

Hubbard, Dan, Websense Security Labs, The Web Vector: Exploiting Human and Browser Vulnerabilities, Toorcon 2005 (http://www.toorcon.org).

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

"Bloom Filter" on Wikipedia, http://en.wikipedia.org/wiki/Bloom_filter, retrieved on Jul. 31, 2009.

Greenfield, P., et al., Access Prevention Techniques for Internet Content Filtering, CSIRO (XP002265027), Dec. 1999.

International Search Report for PCT/US2010/035992, Aug. 11, 2010.

United Kingdom Search Report for corresponding UK Application No. GB0420023.4, Jan. 31, 2005.

United Kingdom Search Report for corresponding UK Application No. GB0420024.2, Nov. 4, 2004.

United Kingdom Search Report for corresponding UK Application No. GB0420025.9, Jan. 6, 2005.

Abiteboul, et al., The Lorel query language for semistructured data, Int'l Journal on Digital Libraries, Apr. 1, 1997, vol. 1, Issue 1, pp. 68-88.

Ang, P. H. et al., "Censorship and the Internet: A Singapore Perspective", Communications of the Association for computing machinery, Jun. 1, 1996, vol. 39, Issue 6, pp. 72-78, New York, NY.

C. L. Schuba and E. H. Spafford, Countering abuse of name-based authentication, Pub: In 22nd Annual Telecommunications Policy Research Conference, 1996, pp. 21.

Chawathe, et al., Representing and querying changes in a semistructured data, Proceedings from 14th Int'l Conference, Feb. 23-27, 1998, pp. 4-13.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

(56) References Cited

OTHER PUBLICATIONS

Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.

Dell Zhang, et al., A data model and algebra for the web, Proceedings 10th Int'l Workshop on Florence, Italy, Sep. 1-3, 1999, pp. 711-714.

European Search Report for Application No. 02255055.2, EPO, Jul. 7, 2004.

European Search Report for Application No. 02258462.7, Jan. 30, 2006

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828 &CFTOKEN=68827537> [retrieved on Dec. 7, 2007], Apr. 23, 2006-Apr. 27, 2006, pp. 1166-1171.

Garcia-Molina et al., Database System Implementation, Department of Computer Science, Stanford University, Prentice Hall, 2000.

Gittler F., et al., The DCE Security Service, Pub: Hewlett-Packard Journal, Dec. 1995, pp. 41-48.

Goldman, R., et al., DataGuides: Enavling Query Formulation and Optimization in Semistructured Databases, Proceeding of the International Conference on Very Large Data Bases, Aug. 26, 1997, pp. 436-445.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for PCT Application No. PCT/US2007/015730 dated Dec. 27, 2008, 16 pages.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Nestorov, et al., Representative objects: concise representations of semistructured, hierarchical Data, Proceedings, 13th Int'l Conference in Birmingham, UK, Apr. 7-11, 1997, pp. 79-90.

Newman, H., A Look at Some Popular Filtering Systems, Pub: Internet, Online!, Jul. 25, 1999, pp. 1-11.

PCT International Search Report and Written Opinion for International Application No. PCT/US2008/052483, PCT, Feb. 11, 2009.

PCT Search Report for PCT/US2006/018823, Sep. 25, 2006.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Secure Computing Corporation, SmartFilter™ Web Tool, Dec. 1, 1998, pp. 1-2.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.com/www/jms/nw-firewall.html, Network World, Jan. 29, 1996, pp. 1-8.

Supplementary European Search Report for EPO App. No. 00 90 7078, May 18, 2004.

SurfControl PLC, SuperScout Web Filter Reviewer's Guide, 2002, pp. 36.

SurfWatch Software, SurfWatch® Professional Edition: Product Overview, Pub: Internet, Online!, May 26, 1999, pp. 1.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL: ftp://ftp.rocksoft.com/clients/rocksoft/papers/vercty10.ps>, Sep. 12, 1994.

Wobus, J., DHCP FAQ, www.nd.edu/~milind/FAQs/FAQ_dhcp, Dec. 29, 1995, pp. 1-10.

Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

Cooley, R., et al., Web Mining: Information and Pattern Discovery on the World Wide Web, Department of Computer Science and Engineering, University of Minnesota, pp. 1-10.

Lee et al., Neural Networks for Web Content Filtering, IEEE, Sep. 2002, pp. 48-57.

Kang et al., Two Phase Approach for Spam-Mail Filtering, Computational and Information Science, First International Symposium, 2004, vol. 3314, pp. 800-805.

Moshchuk et al., SpyProxy: Execution-based Detection of Malicious Web Content, 16th USENIX Security Symposium, 2007, pp. 27-42.

Seifert et al., Identification of Malicious Web Pages with Static Heuristics, ATNAC 2008, IEEE, pp. 91-96.

\* cited by examiner

SYSTEM AND METHOD FOR DYNAMIC AND REAL-TIME CATEGORIZATION OF WEBPAGES

CROSS-REFERENCE TO RELATED APPLICATIONS

This application claims the benefit of U.S. Provisional Patent Application No. 61/077,069, filed on Jun. 30, 2008, the entire contents of which are herein incorporated by reference.

BACKGROUND OF THE INVENTION

1. Field of the Invention

This application relates to scanning webpages for content and more particularly to a system and method for only scanning webpages for updated content if the webpage includes dynamic content.

2. Description of the Related Technology

Internet filtering is the ability to restrict users from accessing certain websites due to the content that the website contains. For example, an employer might restrict employees from accessing certain websites that are objectionable or interfere with productivity. The employer can set policies for employees that only allow the employees to access business related websites during business hours. Similarly, schools and parents might restrict access for students and children to only age appropriate websites.

Additionally, internet filtering is used to prevent users from accessing websites that might contain malicious content. As webpages contain more sophisticated content, it increases the opportunity for malicious code to be downloaded onto the user's computer. As security vulnerabilities in operating systems and web browsing applications become identified, unscrupulous hackers have begun to write malicious code and applications that utilize these vulnerabilities to download themselves onto the user's machine without relying on any particular activity of the user to launch an infected file. One such example of such an attack is the use of malicious code embedded into an active content object of the webpage.

Typically webpage content is categorized using an automated process or manually. A database containing website addresses (URL's) and the categorization of the website is created. This database is transmitted regularly to a network device that filters websites requested by users. However, with this method, there can be a delay between the time a website is categorized and the time the update is sent to the network device such that malicious or inappropriate websites may be accessible by network users.

In order to reduce this delay, real-time scanning techniques have been developed. With these techniques, if a user accesses an uncategorized website, the website is categorized immediately before it is sent to the user. This permits the user to access the website immediately after categorization. However, real-time scanning is only appropriate for uncategorized websites. Due to the number of websites accessible on the Internet, it would be impractical to analyze each and every website a user requests in real-time. Therefore, there is still the threat that malicious or inappropriate content could be present on a website that had been previously categorized. Furthermore, due to the changing nature of some websites (e.g., blogs and social networking sites), the categorization of the websites might have changed such that it should now be blocked by the network device.

SUMMARY

A system and method for categorizing content on a webpage is disclosed. The method comprises receiving a request for a webpage from a user's computer. Next, the system determines whether there is dynamic content on the webpage by looking at the address, links, reputation, type, style and other indicators of being able to change the webpage. If the webpage contains content that can be changed, then the webpage is scanned to determine the categorization thereof. If the webpage does not have dynamic content then the categorization of the webpage will remain the same or if the content has not been categorized, a real time categorization module of the system can categorize the content.

Also, a system and method for allowing a user to update a categorization of a webpage is disclosed. Specifically, a network administrator designates users who are trusted to categorize webpages. The users are then able to change the categorization of webpages without the network administrator's prior approval.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims.

Figure 1:
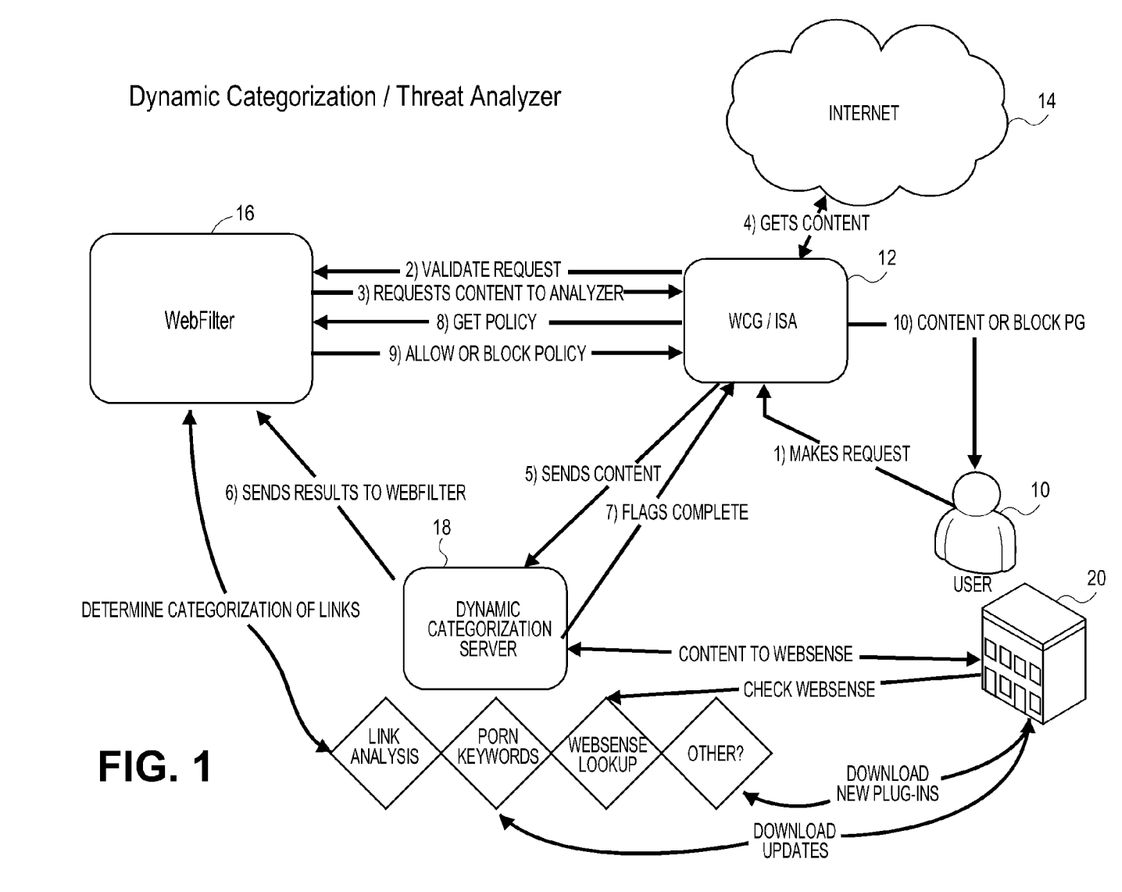
FIG. 1 is a diagram showing a system for dynamic categorization of content on webpages.

FIG. 1 is a diagram showing how dynamic categorization of webpages can be implemented. It will be understood that the modules described below can be implemented in software or hardware on a single computer or multiple computers over a network as is commonly known in the art. A user 10 using a computer requests a webpage from a gateway module 12 which is in communication with the Internet 14. The gateway module 12 is typically located between the user's local network and the Internet and controls the flow of traffic there between. The gateway module 12 validates the user's request with a webfilter 16 in order to determine whether the content of the webpage has been categorized. Specifically, the webfilter 16 determines whether the webpage content has been previously scanned and the content categorized. The webfilter 16 may contain a database of webpage addresses (URLs) of previously scanned webpages with corresponding categorizations thereof. If the content of the webpage has not been scanned then the webpage needs to be categorized in order to determine whether the user 10 should be able to access it. The webfilter 16 instructs the gateway module 16 to send the webpage content to a dynamic categorization server module 18 if the webpage URL is not in a database of webpages previously categorized or if the content on the webpage is known to dynamically change. Webpages with dynamic content are those webpages that have content that frequently changes based upon user interaction (e.g. postings, blogs, photos, etc. . . . ). The address of the webpage, security of the webpage, the reputation of the webpage, and the content contained on the webpage can all be indicators of dynamic content. For example, social networking websites can be considered as dynamic because users are posting new material continuously. As such, the content of social networking websites should be analyzed frequently in order to ensure proper categorization. In order to easily classify webpages as dynamic, the addresses of known dynamic webpages (such as social networking sites) may be stored in the webfilter 16.

If the webpage content has not been categorized or the webfilter 16 determines that the webpage needs to be re-categorized because of dynamic content, then the webfilter 16 requests the content of the webpage from the Internet 14 with the gateway 12. Once the gateway 12 receives the content of the webpage, it sends the content to the dynamic categorization server module 18 for classification. By only scanning and analyzing webpages with dynamic content, the performance of the system can be greatly improved because previously categorized webpages do not need to be rescanned and recategorized.

The dynamic categorization module 18 scans the webpage to analyze the content and determine the proper categorization of the webpage. For example, the dynamic categorization module 18 can look at keywords and links to determine the category of the webpage. The dynamic categorization module 18 can also send the content to a central entity 20 for categorization. Once the webpage has been categorized, the results are sent to the webfilter 16. The webfilter 16 can store the results for future requests by the user 10. The webfilter 16 then gets the policy for the user 10 for the category that the webpage the user was requesting. The webfilter 16 can either block or allow the webpage depending upon the policy and the categorization of the webpage. For example, if the webpage is classified as "porn" and the user's policy for the category "porn" is to block the page, then the webfilter 16 will block access to that page for the user 10. However, if the category is allowed by the policy for the user, then the user 10 will be granted access.

The preceding example describes a webpage as having content as a whole. However, it will be recognized that it is possible to block and allow content on a webpage in different sections. For example, many webpages receive content from many different sources. For these types of webpages, each of the individual pieces of content can be received by the gateway module 12 and categorized by the webfilter 16 and the dynamic categorization server module 18 individually such that each piece of content has its own categorization and can be blocked or allowed independent of the other content on the webpage. In such a system, the URL of each section can be considered a separate webpage such that the combination of all URL's on a webpage comprise the total page.

Figure 2:
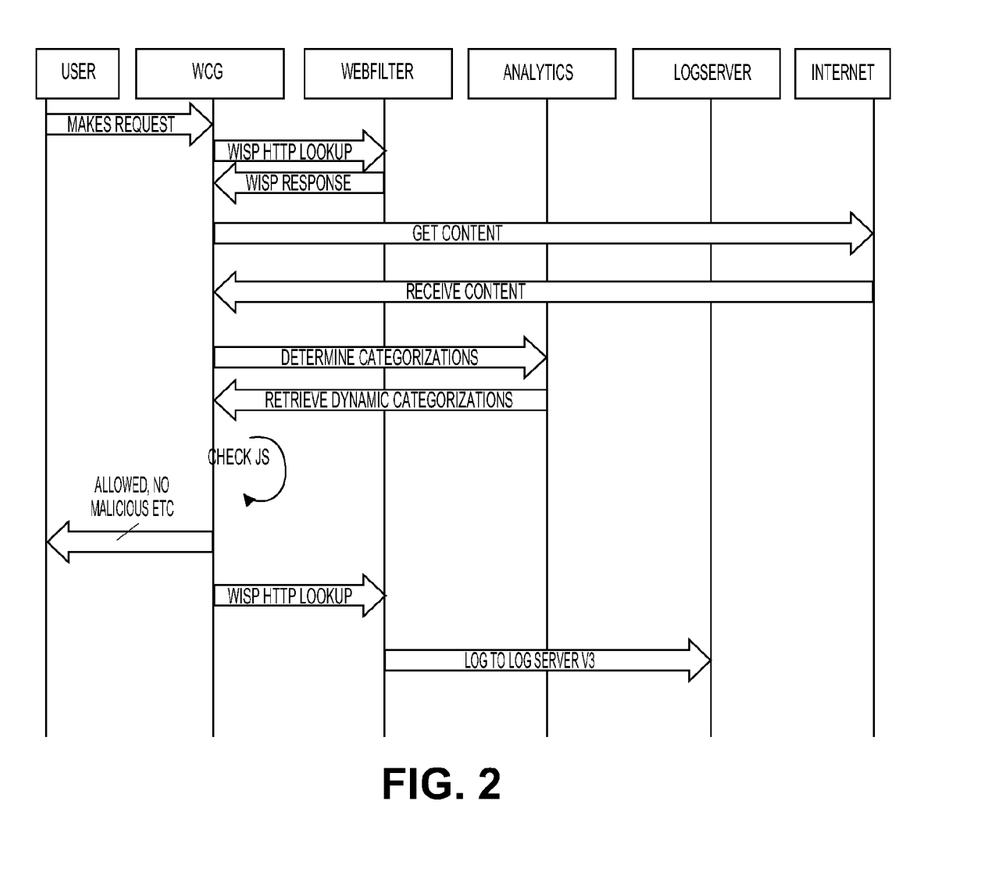
FIGS. 2, 3 and 4 illustrate the process of dynamic categorization using the system shown in FIG. 1.
Figure 3:
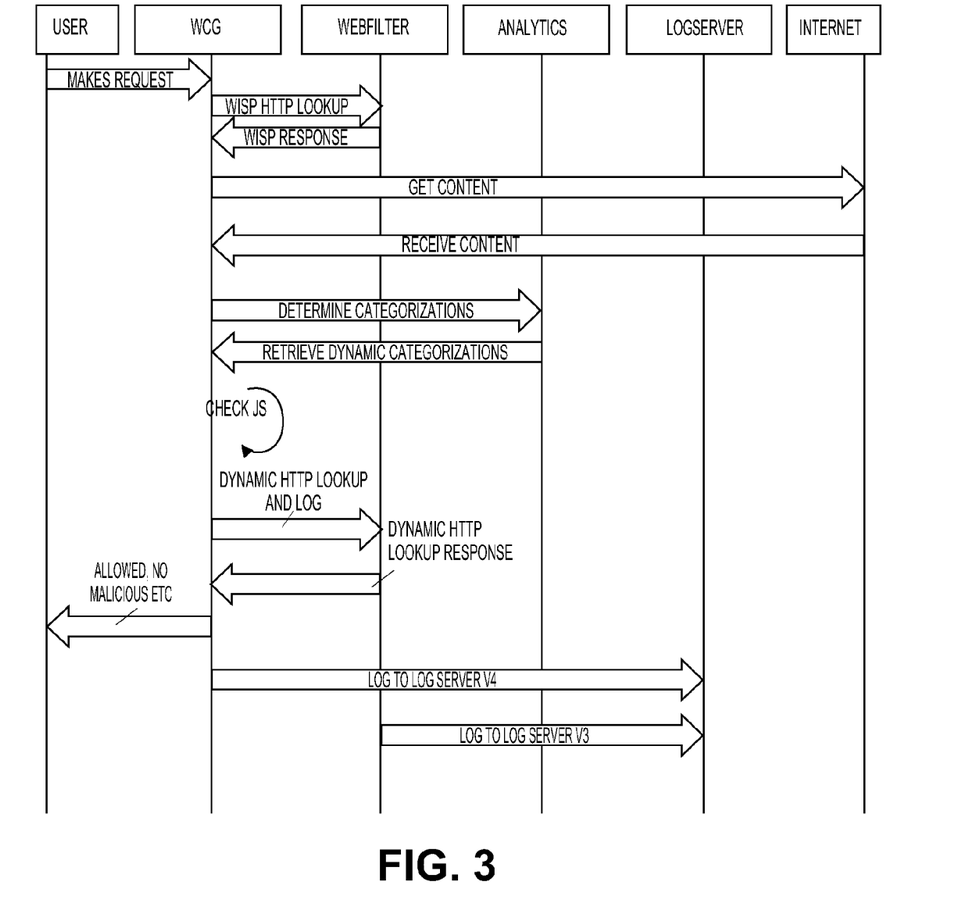
Figure 4:
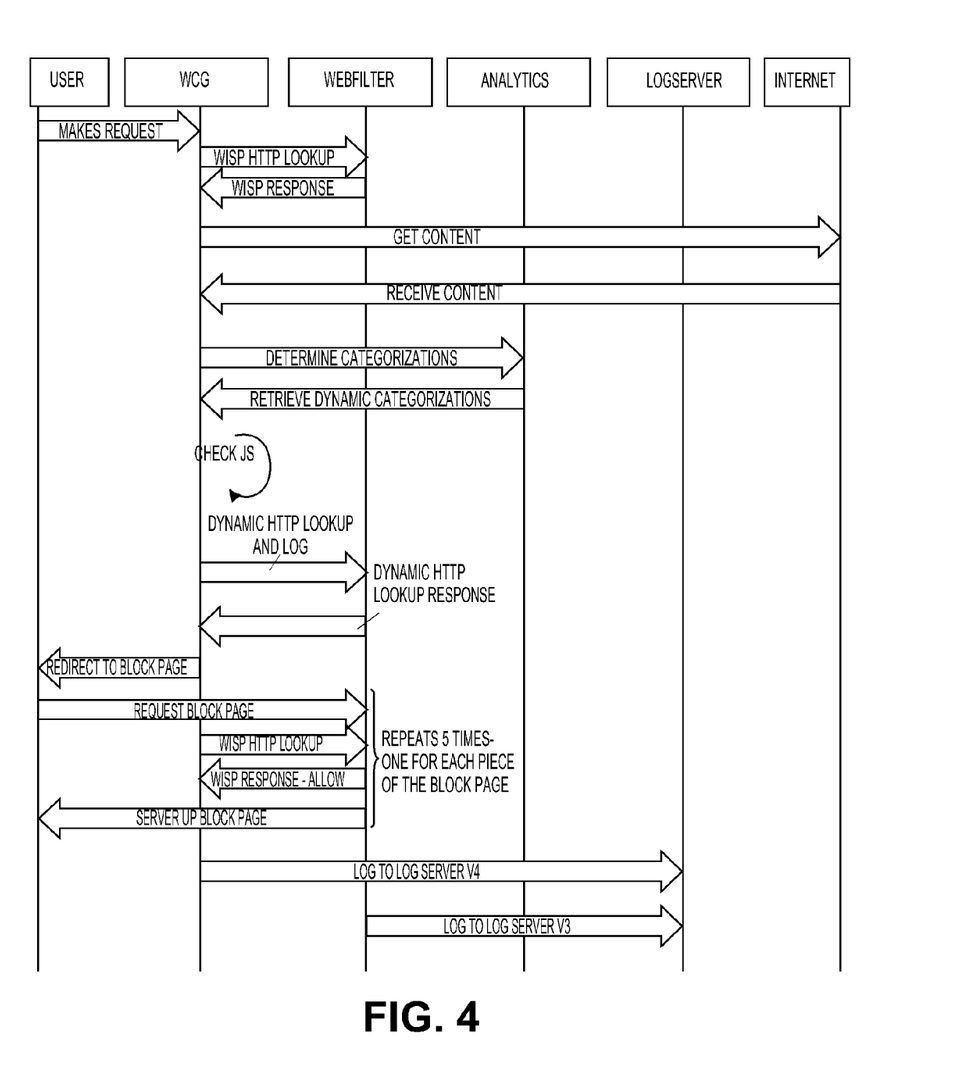

FIGS. 2 and 3 illustrate the process of the system shown in FIG. 1 if the content is allowed and FIG. 4 illustrates the process if the content is blocked.

Specifically, FIG. 2 shows that a user makes a request to the gateway module 12, which in turns performs an HTTP lookup with the webfilter 16. If the request is valid, the gateway module 12 will retrieve the content from the Internet 14. Next the dynamic categorization server module 18 determines the categorization of the content using link analysis, keywords, lookup from a central entity and other indicators of content. Once the categorization is determined, then the content is allowed and sent back the user and the results are logged. FIG. 3 includes the step of logging the results with the webfilter 16 so that they may be available for future lookups. FIG. 4 further includes the step of sending a block page notification to the user if the user is not authorized to view the page or sending the user a webpage indicating that the user can view the webpage for a limited duration. If the user requests to view the page for a limited duration, then the content will be delivered to the user and the results logged.

Figure 5:
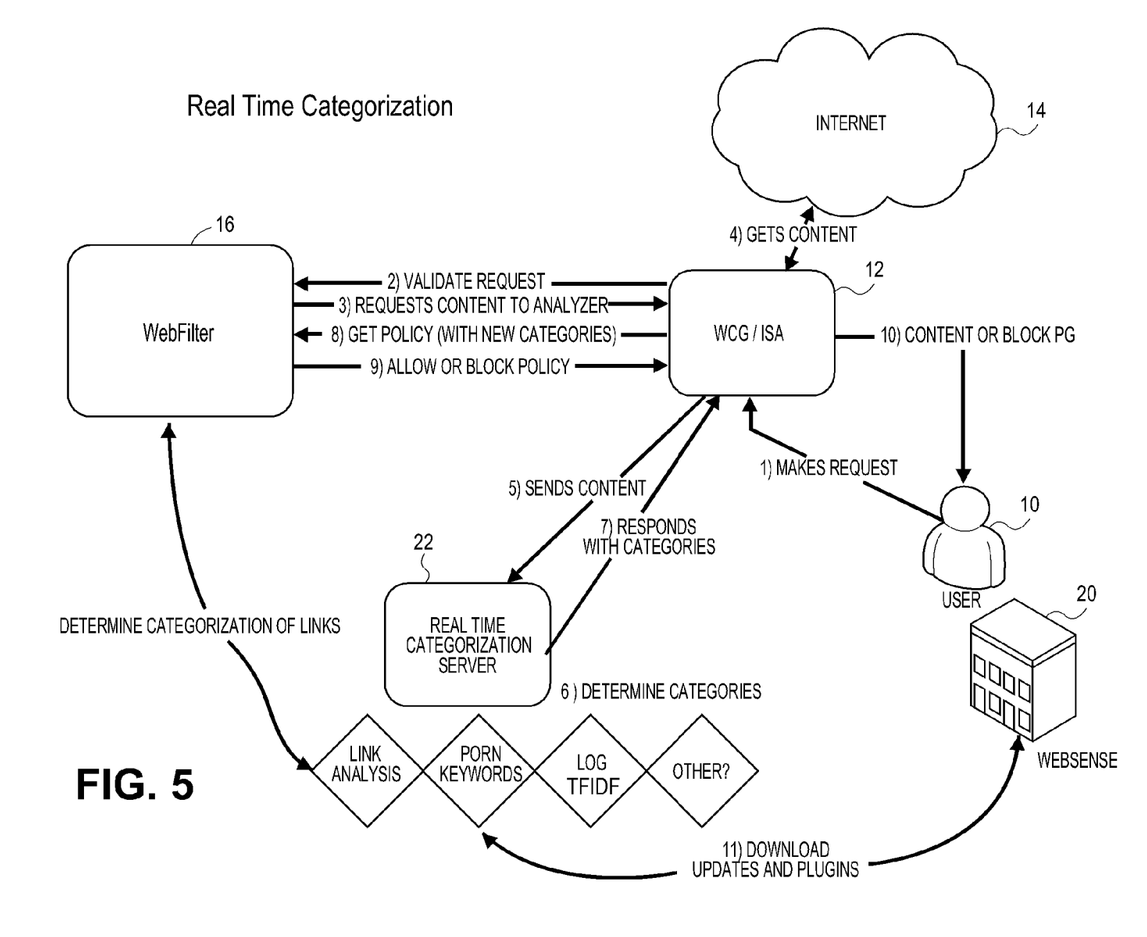
FIG. 5 is a diagram showing a system for real time categorization of content on webpages.

FIG. 5 illustrates a system for real-time categorization of content from webpages. The user 10 makes a request from the content gateway module 12 for a webpage containing content. The content gateway module 12 validates the request with the webfilter 16 to determine if the content has been categorized. If the content has not been categorized, then the webfilter 16 requests the content gateway 12 to get the content from the Internet 14. The content gateway module 12 then sends the content to a real time categorization server module 22 for categorization. The categorization server module 22 uses link analysis, keywords and other linguistic analytics to determine the categorization of the content on the webpage. Updates from a central entity 20 enable the categorization server module 22 to accurately determine and categorize the content of the webpage.

The categorization server module 22 sends the categorization results to the content gateway 12. The webfilter 16 then receives the policy of the user 10 with the categories of the content in order to determine whether to block or allow the content. The allow or block policy is then transmitted from the webfilter 16 to content gateway module 12 in order to either block or allow access to the content of the webpage for the user 10. It will be recognized that the dynamic categorization server module 18 and the real time categorization server module 22 can be combined in the same system in order to provide real time categorization to webpages that have not been categorized.

Figure 6:
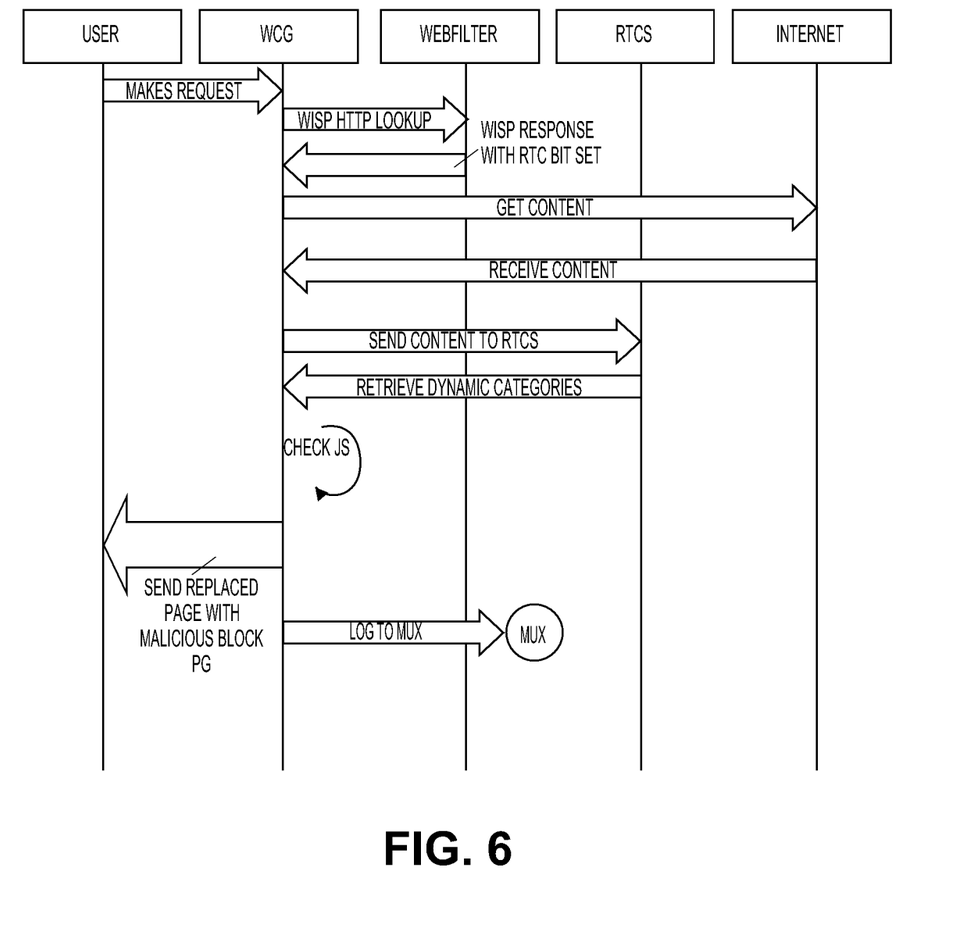
FIGS. 6, 7, 8 and 9 illustrate the process of real time categorization of content of webpages using the system shown in FIG. 5.

FIG. 6 illustrates the process if the content on the webpage is determined to be malicious by the real time categorization server module 22 using the system of FIG. 5. Specifically, the user 10 makes a request to the content gateway 12. The webfilter 16 performs an HTTP lookup and then the content gateway 12 retrieves the content from the Internet 14. The gateway 12 then sends the content to the real time categorization server module 22 which performs an immediate categorization of the content. If the real time categorization server module 22 detects malicious content, then the content gateway 12 returns a blocked page message to the user 10 and logs the results.

Figure 7:
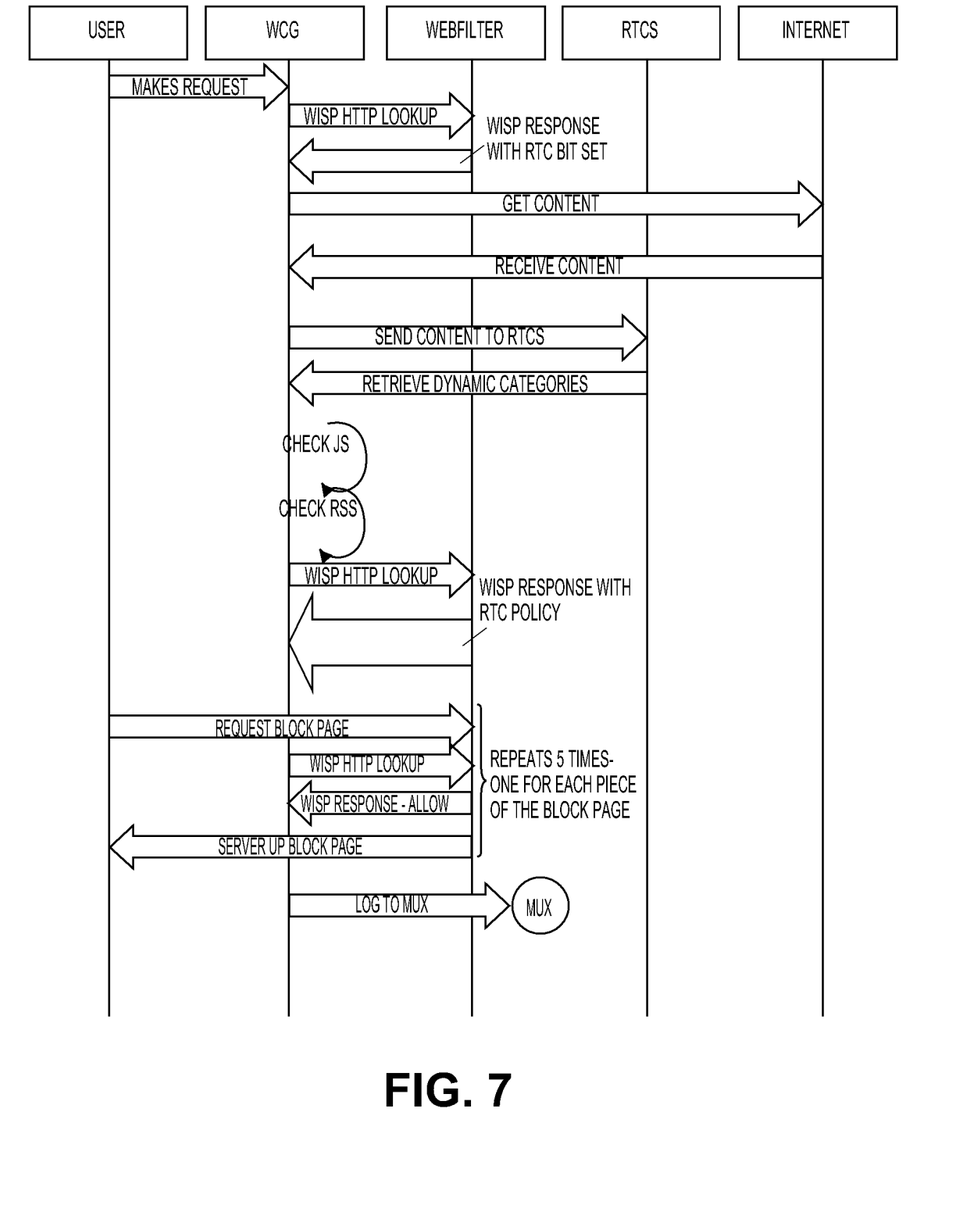
Figure 8:
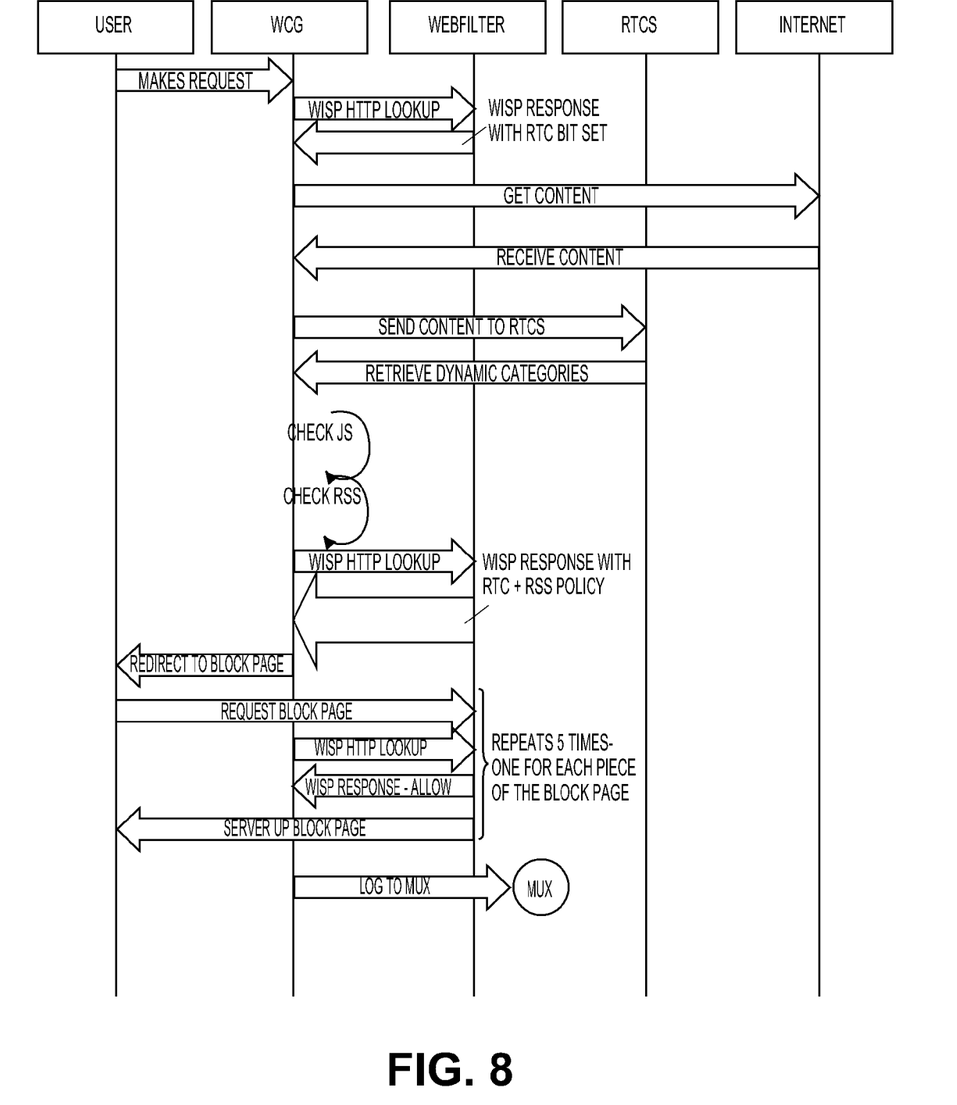
Figure 9:
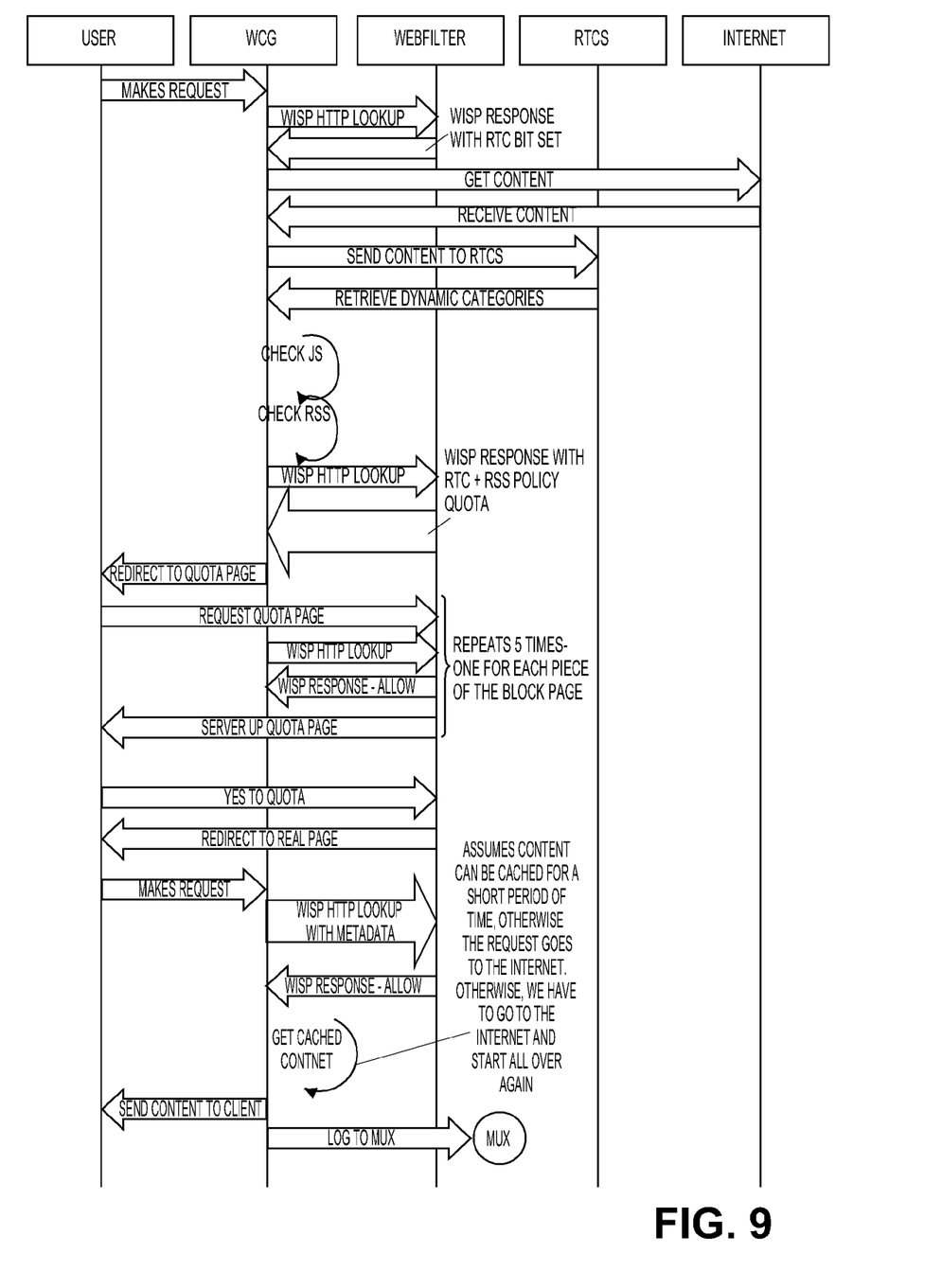

FIGS. 7 and 8 show how content from a webpage is blocked using the system of FIG. 5. FIG. 9 shows how the system of FIG. 5 operates if a quota system for viewing webpages is in effect for the user 10. For example, the system of FIG. 5 can have policies for user 10 that allow access to normally blocked content for a prescribed period of time. This time is commonly referred to a "quota time".

Figure 10:
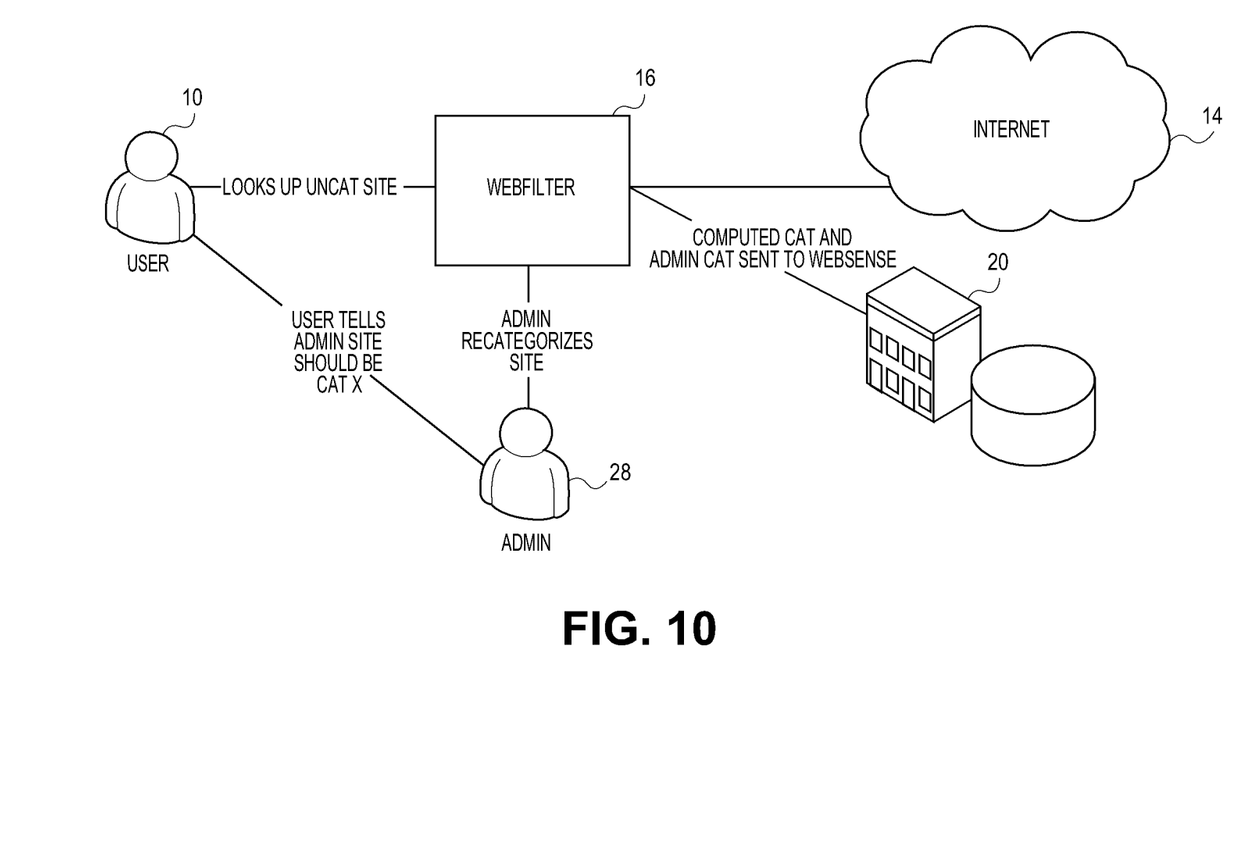
FIG. 10 is a diagram showing a system for user categorization of content on webpages.

Referring to FIG. 10, a system for categorizing webpage content based upon a user's recommendation is shown. Instead of using real time classification of websites, a user 10 can also recommend the categorization for webpages that are uncategorized. Specifically, the user 10 requests an uncategorized site from the Internet 14. The webfilter 16 recognizes the request and retrieves the site because it is uncategorized. The user can then suggest to an administrator 28 the proper categorization. The administrator 28 then changes the categorization in the database of the webfilter 16. In this example, the user 10 does not have the authority to change the categorization of the webpage because the user 10 is untrusted. Only the administrator 28 can change the categorization. The webfilter 16 transmits the categorization to the central entity 20 in order to apply and publish the categorization to others.

It is also contemplated for the administrator 28 to grant "categorization" access to the user 10. In this scenario, the administrator 28 determines that the user 10 can be trusted to categorize the content of websites that are uncategorized. This allows the user 10 to categorize websites that are then automatically published to the database of the webfilter 16 and sent to the central entity 20 without any further approval of the administrator 28.

Those of skill will recognize that the various illustrative logical blocks, modules, circuits, and algorithm steps described in connection with the embodiments disclosed herein may be implemented as electronic hardware computer software or combinations of both. To clearly illustrate this interchangeability of hardware and software, various illustrative components, blocks modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present invention. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from and write information to, the storage medium. In the alternative, the storage medium may be integral to the processor. The processor and the storage medium may reside in an ASIC. The ASIC may reside in a user terminal or some other type of device. In the alternative the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method for categorizing dynamic content on a webpage using a dynamic categorization computer system, the method comprising:
   in response to a gateway hardware computer receiving a request for a webpage from a user over a computer network,
      determining, via an electronic processor, whether the webpage is categorized;
      in response to determining, via the electronic processor, the webpage is categorized, determining whether the webpage contains dynamic content, and
      in response to determining the webpage contains dynamic content,
      re-categorizing content of the webpage with the dynamic categorization computer system; and
      in response to determining, via the electronic processor, the webpage is uncategorized:
         receiving, by the electronic processor, a suggested category for the webpage from the user, wherein the user is untrusted and does not have authority to change a category of the webpage, and
         receiving, in response to the suggested category, via the electronic processor, a categorization of the webpage from an administrator, wherein the categorization from the administrator is the suggested category;
      receiving, via the electronic processor, a policy associated with the user;
      blocking or allowing the request for the webpage via the gateway hardware computer based on the categorization and the user policy.

2. The method of claim 1, wherein determining if the webpage contains dynamic content comprises analyzing one or more of an address of the webpage, one or more links included in the webpage, and a reputation of the webpage.

3. The method of claim 1, wherein the webpage includes multiple sections and the content of each section is analyzed and categorized.

4. The method of claim 1, further comprising allowing access to the webpage for the user's computer in response to the categorization of the webpage.

5. The method of claim 4, wherein allowing access further comprises blocking access if the content is malicious.

6. A system for categorizing content on a webpage with a computer system, the system comprising:
   one or more hardware processors configured to:
      receive a request for a webpage from a user over a computer network,
      determine whether the webpage is categorized;
      in response to determining the webpage is categorized, determine whether the webpage includes dynamic content;
      in response to determining the webpage includes dynamic content, re-categorizing the webpage, and
      in response to determining the webpage is not categorized, receive a suggested category for the webpage from the user, wherein the user is untrusted and does not have authority to change a category of the webpage,
      receive, in response to the suggested category, a categorization of the webpage from an administrator, wherein the categorization from the administrator is the suggested category,
      receive a policy associated with the user; and
      block or allow the request for the webpage based on the categorization of the webpage from the administrator and the policy.

7. The system of claim 6, wherein the one or more hardware processors are further configured to determine if the webpage contains dynamic content by analyzing an address of the webpage.

8. The system of claim 6, wherein the one or more hardware processors are further configured to determine if the webpage contains dynamic content by analyzing one or more of an address of the webpage, one or more links included in the webpage, and a reputation of the webpage.

9. The system of claim 6, wherein the webpage contains multiple sections and the content of each section is analyzed.

10. The system of claim 6, wherein the one or more hardware processors are further configured to implement a real time categorization server module configured to categorize the dynamic content of the webpage.

11. The system of claim 10, wherein the one or more hardware processors are configured to categorize each section of the webpage if the content is dynamic.

12. A system for determining dynamic content on a webpage-requested by a user over a network, the system comprising:
 a hardware computer configured to:
  determine whether the webpage is categorized and in response to the webpage being categorized, determine whether the webpage includes dynamic content,
  re-categorize a content of the webpage in response to the webpage being categorized and containing content that is dynamic,
  in response to determining the webpage is uncategorized, receive a suggested category for the webpage from the user, wherein the user is untrusted and does not have authority to change a category of the uncategorized webpage,
  receive, in response to the suggested category, a categorization of the uncategorized webpage from an administrator, wherein the categorization from the administrator is the suggested category,
  receive policy information for the user, and
  allow or block the webpage based on the categorization from the administrator and the policy information.

13. The system of claim 12, wherein the one or more hardware processors are configured to analyze addresses of the webpage content in order to determine if the content is dynamic.

14. The system of claim 13, wherein the one or more hardware processors are configured to categorize the content of the webpage.

* * * * *